US008955881B2

(12) United States Patent
Tinnin

(10) Patent No.: US 8,955,881 B2
(45) Date of Patent: Feb. 17, 2015

(54) TELESCOPING STEERING COLUMN HAVING RAKE SPRING

(75) Inventor: Melvin L. Tinnin, Clio, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 340 days.

(21) Appl. No.: 13/461,366

(22) Filed: May 1, 2012

(65) Prior Publication Data

US 2012/0285285 A1 Nov. 15, 2012

Related U.S. Application Data

(60) Provisional application No. 61/485,708, filed on May 13, 2011.

(51) Int. Cl.
*B62D 1/187* (2006.01)
*B62D 1/19* (2006.01)

(52) U.S. Cl.
CPC ................ *B62D 1/187* (2013.01); *B62D 1/192* (2013.01); *B62D 1/195* (2013.01)
USPC ............... 280/775; 280/777; 74/493

(58) Field of Classification Search
USPC ................... 280/775, 777; 74/493
See application file for complete search history.

(56) References Cited

U.S. PATENT DOCUMENTS

| 4,543,848 A * | 10/1985 | Beauch ........................ 74/493 |
| 7,401,813 B2 * | 7/2008 | Sawada et al. ............... 280/775 |
| 7,780,196 B2 * | 8/2010 | Cymbal et al. ............... 280/777 |
| 2005/0104353 A1 * | 5/2005 | Ikeda et al. ................... 280/775 |

FOREIGN PATENT DOCUMENTS

| DE | 4118863 C1 | 9/1992 |
| DE | 10114463 A1 | 9/2002 |
| DE | 102006054108 B3 | 2/2008 |

OTHER PUBLICATIONS

German Search Report for German Application No. 102012207940.8; Dated: Feb. 25, 2013; 7 pages.
English Translation of German Search Report; German Application No. 102012207940.8; 2 pages.

* cited by examiner

*Primary Examiner* — Drew Brown
(74) *Attorney, Agent, or Firm* — Cantor Colburn LLP

(57) ABSTRACT

A steering column assembly having a standard operating position and a collapsed position is provided. The steering column assembly includes a lower column jacket, an upper column jacket selectively slidable relative to the lower column jacket, a rake bracket, and a biasing member. The rake bracket is attached to one the lower column jacket and the upper column jacket, and has a bracket retaining feature. The biasing member selectively exerts a biasing force on the upper column jacket in the standard operating position. The biasing member has a biasing member retaining feature that engages with the bracket retaining feature in the standard operating position and disengages with the bracket retaining feature in the collapsed position.

17 Claims, 5 Drawing Sheets

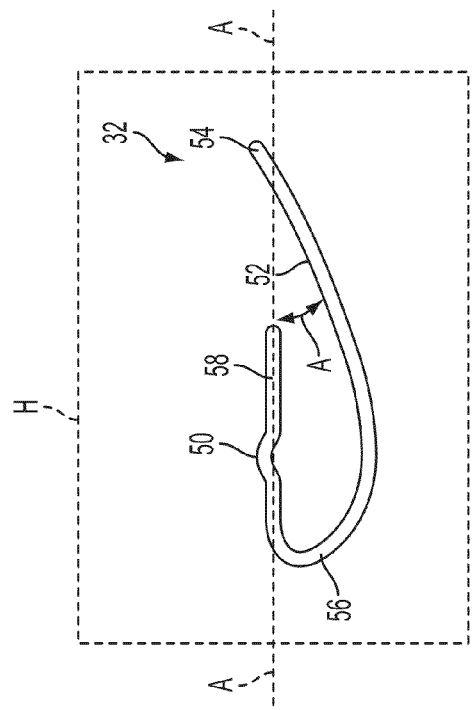
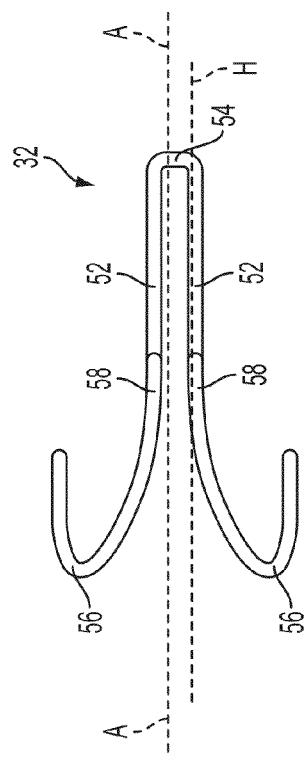
FIG. 4A
FIG. 4B

TELESCOPING STEERING COLUMN HAVING RAKE SPRING

CROSS-REFERENCES TO RELATED APPLICATIONS

This patent application claims priority to U.S. Provisional Patent Application Ser. No. 61/485,708 filed May 13, 2011 which is hereby incorporated herein by reference in its entirety.

FIELD OF THE INVENTION

The present invention relates to a steering column assembly and more particularly to a steering column assembly having a biasing member that selectively exerts a biasing force on an upper column jacket.

BACKGROUND OF THE INVENTION

Steering columns for automotive vehicles typically include various adjustment mechanisms that allow an operator of the vehicle to position and lock the steering column in a variety of positions. The steering column is pivoted by the operator to adjust the position of the steering wheel in a specific location. A biasing device such as, for example, a rake spring may be provided to assist the operator in pivoting the steering column. Specifically, the rake spring typically provides an assist force that reduces the amount of effort needed by the operator to pivot the steering column.

SUMMARY OF THE INVENTION

A steering column assembly having a standard operating position and a collapsed position is provided. The steering column assembly includes a lower column jacket, an upper column jacket selectively slidable relative to the lower column jacket, a rake bracket, and a biasing member. The rake bracket is attached to one the lower column jacket and the upper column jacket, and has a bracket retaining feature. The biasing member selectively exerts a biasing force on the upper column jacket in the standard operating position. The biasing member has a biasing member retaining feature that engages with the bracket retaining feature in the standard operating position and disengages with the bracket retaining feature in the collapsed position.

In another embodiment, a steering column assembly having a standard operating position and a collapsed position is provided. The steering column assembly includes a lower column jacket, an upper column jacket selectively slidable relative to the lower column jacket, a rake bracket, a housing, a biasing member, and a connector. The rake bracket is attached to the lower column jacket. The rake bracket has a bracket retaining feature. The housing is attached to the upper column jacket. The housing is configured to exert a displacement force as the steering column assembly is actuated between the standard operating position and the collapsed position. The biasing member selectively exerts a biasing force on the upper column jacket in the standard operating position. The biasing member has a biasing member retaining feature that engages with the bracket retaining feature in the standard operating position and disengages with the bracket retaining feature in the collapsed position. The housing is configured to exert the displacement force to disengage the biasing member retaining feature with the bracket retaining feature. The connector retains a portion of the biasing member. The housing exerts the displacement force upon the connector, where the displacement force is configured to urge the connector and the biasing member in an axial direction towards the lower column jacket.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIGS. 4A-4B illustrate a biasing member of the steering column assembly shown in FIG. 1.

DETAILED DESCRIPTION

Figure 1:
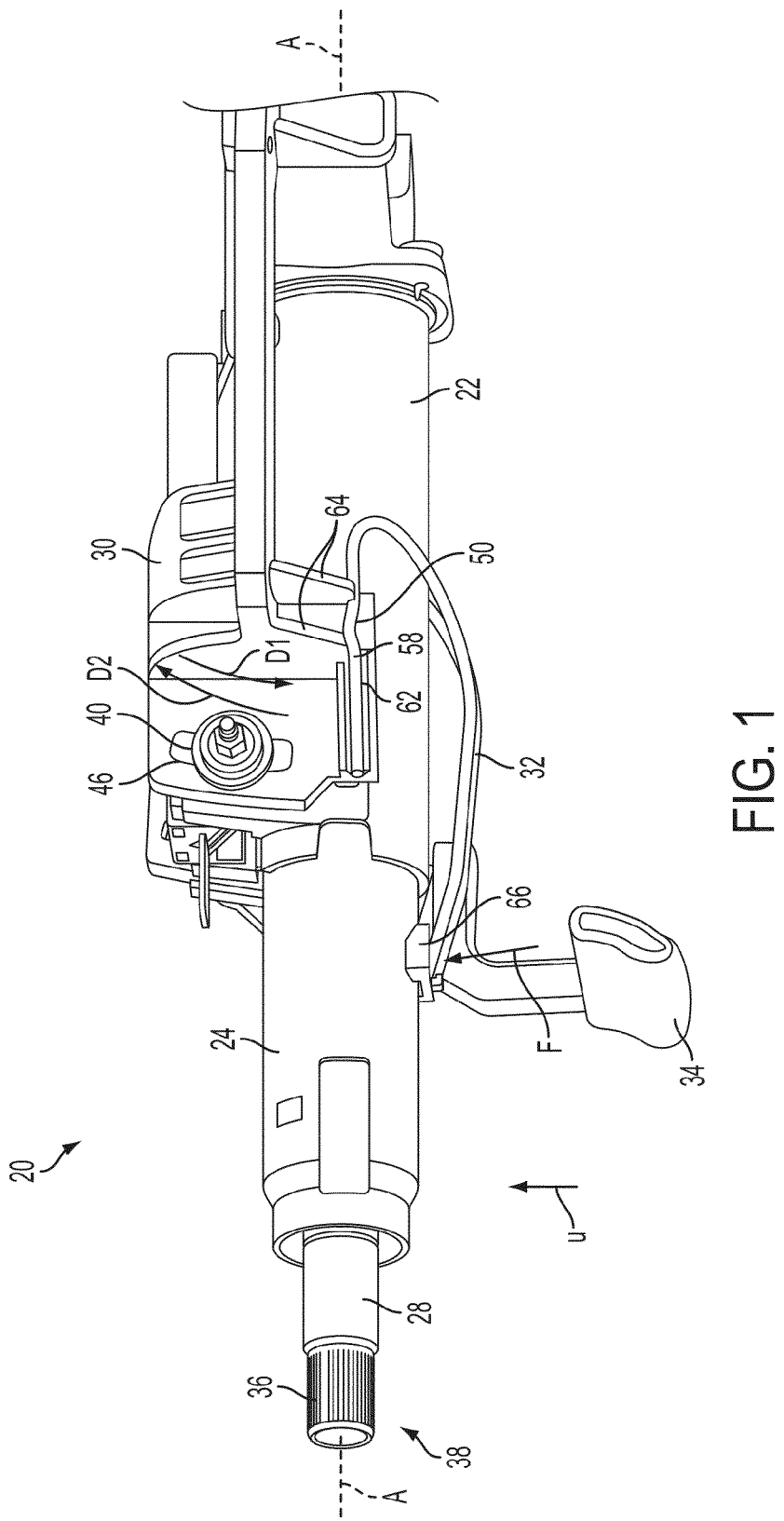
FIG. 1 is an illustration of a steering column assembly in a standard operating position.

Referring now to the Figures, where the invention will be described with reference to specific embodiments, without limiting same, FIG. 1 illustrates a steering column assembly 20 in accordance with the present invention. The steering column assembly 20 includes a lower column jacket 22 and an upper column jacket 24. The upper column jacket 22 is selectively slidable telescopically within the lower column jacket 24 along an axis A-A of the steering column assembly A-A. The steering column assembly includes a steering shaft 28, a rake bracket 30, a biasing member 32, and a tilt adjustment handle 34. The steering shaft 28 extends through the lower column jacket 22 and the upper column jacket 24 and includes a plurality of splines 36 at a distal end 38 for engaging a steering wheel (not shown).

Figure 3:
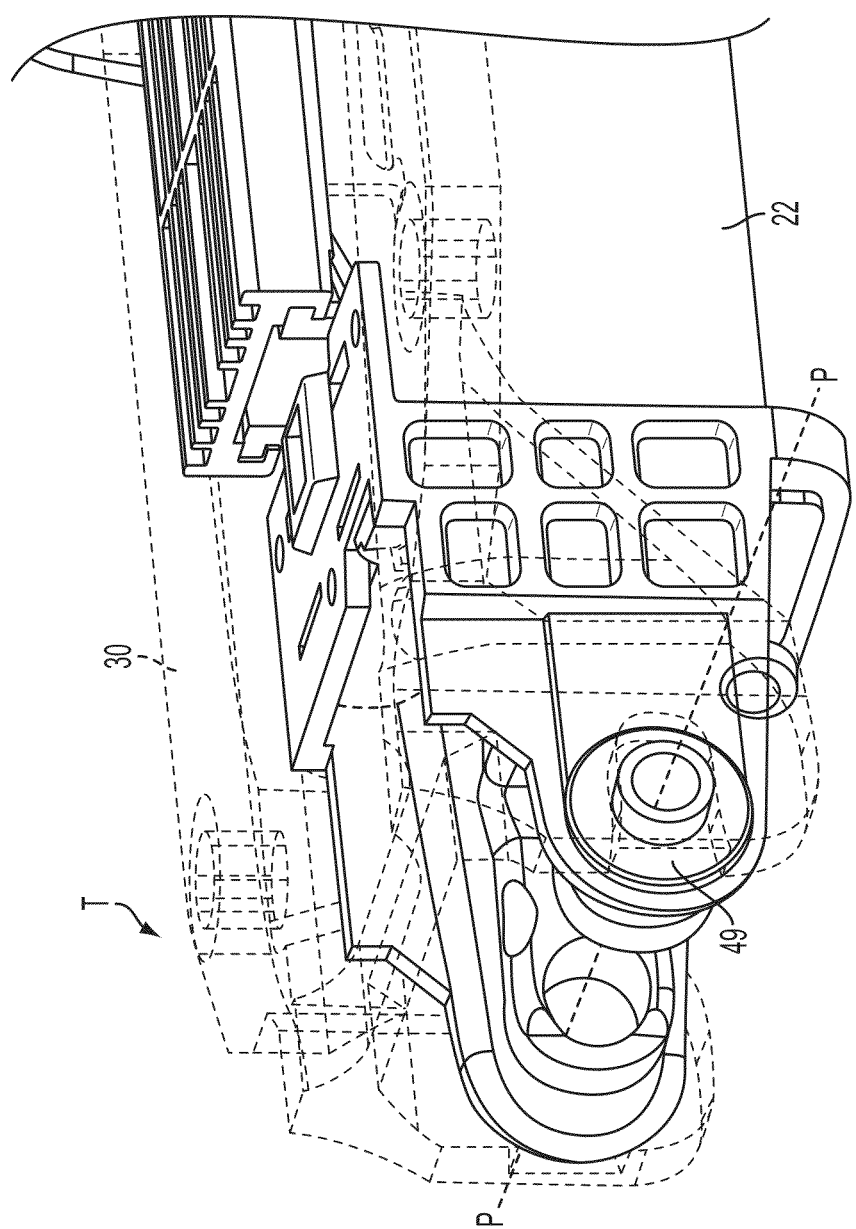
FIG. 3 is an illustration of a portion of the steering column assembly according to one aspect of the invention.

In the exemplary embodiment as shown in FIG. 1, the rake bracket 30 is secured to the lower column jacket 22, however it is understood that the rake bracket 30 could be secured to the upper column jacket 24 as well. In one embodiment, the rake bracket 30 may be secured to the lower column jacket 22 by a mechanical fastening system 40 including, for example, a threaded bolt and a nut. However, it is understood that other approaches may be used as well to secure the rake bracket 30 to the lower column jacket 22. The rake bracket 30 includes a slot 46 for receiving the mechanical fastening system 40. The mechanical fastening system 40 is slidable in directions D1 and D2 within the slot 46, thereby allowing the rake bracket 30 and the lower column jacket 22 to selectively pivot relative to one another about a pivot axis P-P (shown in FIG. 3). Specifically, turning to FIG. 3, a tilt or rake transition area T between the rake bracket 30 and the lower column jacket 22 is shown. A fastener 49 is located along the pivot point P-P, and joins the rake bracket 30 and the lower column jacket 22 together.

Turning back to FIG. 1, the biasing member 32 may be, for example, a rake spring that exerts a biasing force. The biasing member 32 may be constructed from a relatively resilient material such as, for example, spring steel. In one exemplary embodiment, the biasing member 32 is constructed from a music wire, such as, for example, a music wire per American Society for Testing and Materials (ASTM) 228. However, it is understood that the biasing member 32 may be constructed from other materials as well.

Turning now to FIGS. 4A-4B, an exemplary configuration of the biasing member 32 is illustrated, where FIG. 4A is a plan view of the biasing member 32 and FIG. 4B is a side view of the biasing member 32. The biasing member 32 includes a profile that defines two retaining features 50 (where one of the retaining features 50 is shown in FIG. 4B), two generally linear sections 52, a receiving feature 54, two generally arced or curved portions 56, and two retaining portions 58. The retaining feature 50 includes geometry that facilitates retention of the biasing member 32 by the rake bracket 30 (FIGS. 1-2), which is described below. With specific reference to FIG. 4A, when shown in the plan view, the two linear sections 52 extend axially with respect to the axis A-A of the steering column assembly 20 (shown in FIGS. 1-2). Each of the two linear sections 52 are connected to the receiving feature 54 of the biasing member 32. Referring now to the side view of the biasing member 32 shown in FIG. 4B, the linear sections 52 are each positioned at an angle A. The angle A is oriented in a plane H that is generally parallel with the axis A-A. In the exemplary embodiment as shown in FIG. 4B, the angle A is about 30° with respect to the axis A-A, however it is to be understood that the angle A may include other dimensions as well.

Referring back to FIG. 1, the rake bracket 30 includes a slot 62. The slot 62 is configured for slidably receiving one of the retaining portions 58 of the biasing member 32. The slot 62 and the retaining portions 58 of the biasing member 32 are both generally axially aligned with the axis A-A of the steering column assembly 20. The rake bracket 30 also includes at least one retaining feature 64 for selectively engaging the retaining feature 50 of the biasing member 32. In the exemplary embodiment as shown, the retaining feature 64 includes two ribs that selectively engage with the retaining feature 50 the biasing member 32. The geometry of the retaining feature 50 includes a bulge or curved profile that is shaped to selectively engage with the retaining feature 64 of the rake bracket 30. It should be noted while FIGS. 1-2 illustrate the curved profile as the retaining feature 50 of the biasing member 32, and the ribs as the retaining feature 64 of the rake bracket 30, it is understood that other approaches may be used as well for selectively engaging the biasing member 32 with the rake bracket 30.

Figure 2:
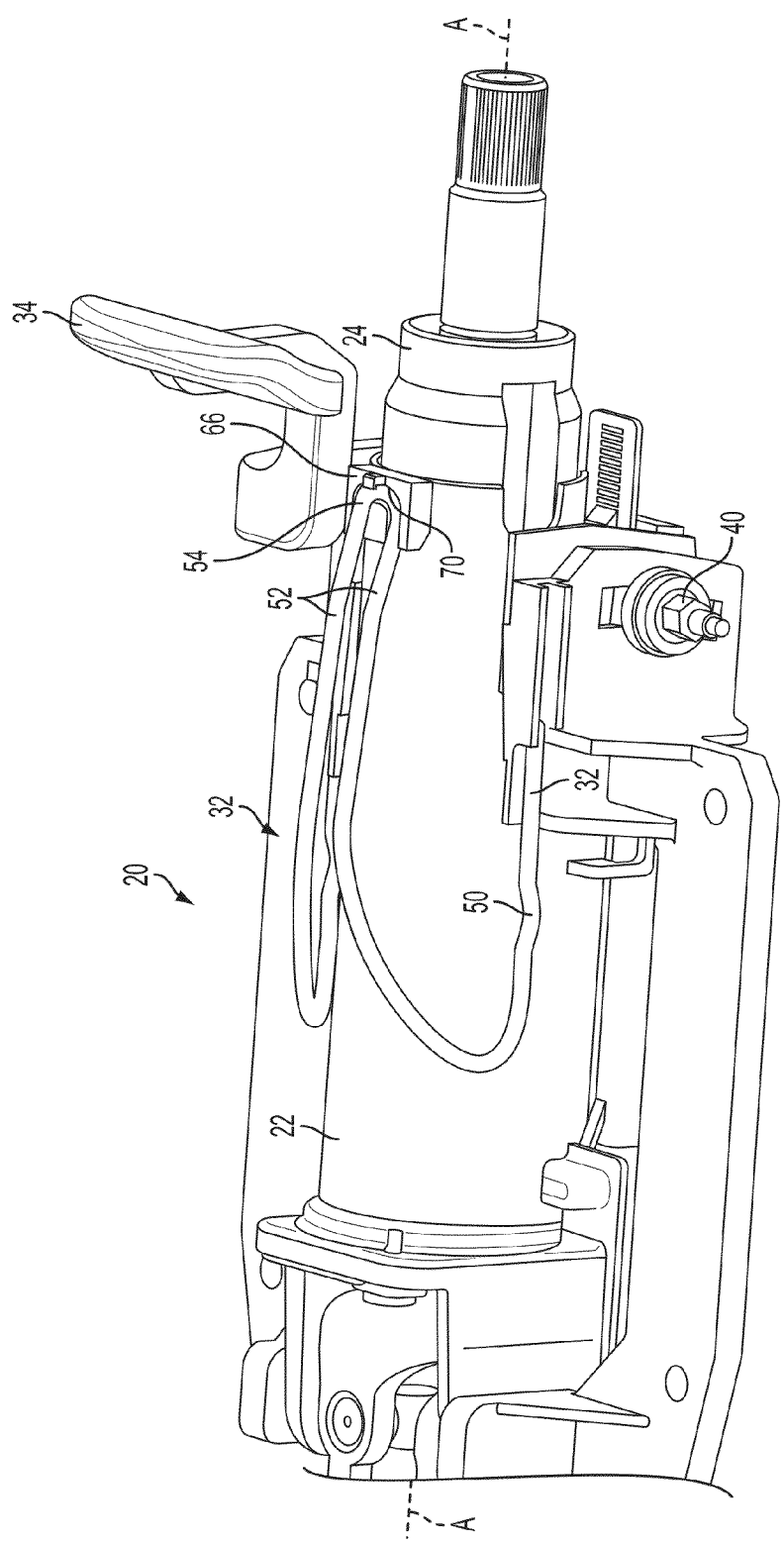
FIG. 2 is an illustration of the steering column assembly shown in FIG. 1 in a collapsed position.

With continued reference to FIGS. 1-2, the steering column assembly 20 also includes a connector 66. In the embodiment as shown, the connector 66 is configured to retain the receiving feature 54 of the biasing member 32. As seen in FIG. 2, the connector 66 may include a corresponding recess 70 for receiving the receiving feature 54 of the biasing member 32.

FIG. 1 illustrates of the steering column assembly 20 in a standard operating position. In the standard operating position, the retaining feature 50 of the biasing member 32 is engaged with the retaining feature 64 of the rake bracket 30, and the biasing member 32 is employed to reduce the amount of effort required to pivot the steering column assembly 20. Specifically, the biasing member 32 exerts a biasing force F on the upper column jacket 24. In the embodiment as shown, the biasing force F is oriented in a direction U towards the upper column jacket 24, which in turn reduces the effort needed by an operator to adjust the steering column assembly 20 by the tilt adjustment handle 34.

During a frontal impact event, the upper column jacket 24 slides telescopically within the lower column jacket 22 and into a collapsed position, which is illustrated in FIG. 2. When the steering column assembly 20 is in the collapsed position, the retaining feature 50 of the biasing member 32 is displaced in an axial direction towards the lower column jacket 22, and disengages with the retaining feature 64 of the rake bracket 30 (shown in FIG. 1). In one embodiment, the retaining feature 50 of the biasing member 32 may be deformed or snapped out of place during the frontal impact, which allows for the retaining feature 50 of the biasing member 32 to disengage with the retaining feature 64 of the rake bracket 30 (shown in FIG. 1).

Figure 5:
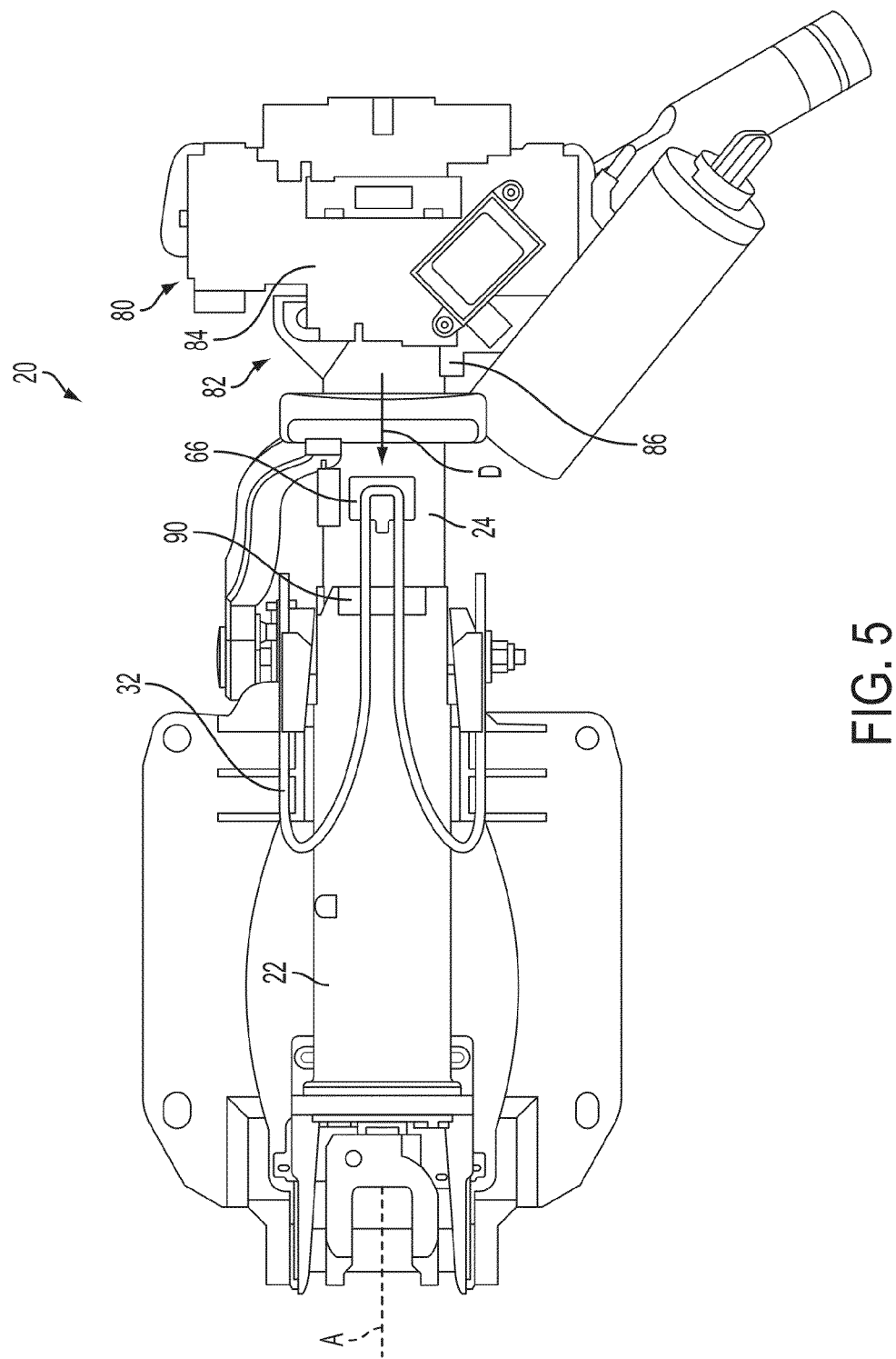
FIG. 5 is a view of the steering column assembly shown in FIG. 1 according to another aspect of the invention.

FIG. 5 is an illustration of the steering column assembly 20 in the standard operating position. During a frontal impact event, the connector 66 is urged in an axial direction along the axis A-A, and towards the lower column jacket 22 by a housing 80. The housing 80 is attached to a distal end 82 of the upper column jacket 24. The housing 80 may be, for example, either a Column Electric Assembly (CEA) housing 84 or a switch assembly 86. Specifically, a portion of either the CEA housing 84 or the switch assembly 86 makes contact with and abuts against the connector 66 during a frontal impact event. The housing 80 exerts a displacement force D upon the connector 66 as the steering column assembly 20 is actuated between the standard operating position and the collapsed position during a frontal impact event. As the displacement force D is exerted upon the connector 66, the connector 66 and the biasing member 32 are urged or displaced in an axial direction towards the lower column jacket 22. The axial movement of the biasing member 32 towards the lower column jacket 22 also disengages the retaining feature 50 of the biasing member 32 with the retaining feature 64 of the rake bracket 30 (shown in FIGS. 1-2). In one embodiment, the lower column jacket 22 may include a ramped surface 90 for facilitating movement of the connector 66 along a portion of the lower column jacket 22.

Referring generally to FIGS. 1-5, the biasing member 32 is positioned to exert the biasing force F on the upper column jacket 24 to provide support to a steering wheel (not shown) located on the distal end 38 of the steering shaft 28. Some other types of rake mechanisms that are currently available typically exert a biasing force on the lower column jacket of the steering column assembly. In contrast, the biasing member 32 of the present invention allows for a reduced amount of effort required to pivot or rake the steering column assembly 20 by the tilt adjustment handle 34 when compared to some currently available steering column assemblies. This is because the biasing member 32 exerts the biasing force F on the upper column jacket 24, which in turn decreases a moment arm of the steering column assembly 20. Thus, the biasing force F is exerted by the biasing member 32 at a location that is closer to the steering wheel (not shown) when compared to some other currently available steering column assemblies. Although the moment arm of the steering column assembly 20 is decreased, during a frontal impact event the biasing member 32 is able move in an axial direction towards the lower column jacket 22, and out of the way of an operator. Moreover, positioning the biasing member 32 to exert force on the upper column jacket 24 results in reduced telescoping efforts by an operator when compared to some current steering column assemblies that have a biasing member supporting the lower column jacket.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly having a standard operating position and a collapsed position, comprising:
    a lower column jacket;
    an upper column jacket selectively slidable relative to the lower column jacket;
    a rake bracket attached to one the lower column jacket and the upper column jacket, the rake bracket having a bracket retaining feature; and
    a biasing member that selectively exerts a biasing force on the upper column jacket in the standard operating position, the biasing member having a biasing member retaining feature that engages with the bracket retaining feature in the standard operating position and disengages with the bracket retaining feature in the collapsed position;
    comprising a connector that retains a portion of the biasing member;
    comprising a housing attached to the upper column jacket, the housing configured to exert a displacement force as the steering column assembly is actuated between the standard operating position and the collapsed position, and wherein the housing exerts the displacement force upon the connector, and wherein the displacement force urges the connector and the biasing member in an axial direction towards the lower column jacket.

2. The steering column assembly as recited in claim 1, wherein the housing is configured to exert the displacement force to disengage the biasing member retaining feature with the bracket retaining feature.

3. The steering column assembly as recited in claim 1, wherein the biasing member retaining feature is a curved profile configured to selectively engage with the bracket retaining feature.

4. The steering column assembly as recited in claim 3, wherein the generally curved profile is selectively deformed to disengage from the bracket retaining feature.

5. The steering column assembly as recited in claim 1, wherein the bracket retaining feature is a plurality of ribs that selectively engage with the biasing member.

6. The steering column assembly as recited in claim 1, wherein the biasing member is constructed from a music wire conforming to ASTM 228.

7. The steering column assembly as recited in claim 1, wherein the housing is one of a switch assembly and a Column Electric Assembly (CEA).

8. The steering column assembly as recited in claim 1, wherein the rake bracket is attached to the lower column jacket by a fastener.

9. The steering column assembly as recited in claim 1, wherein the rake bracket and the lower column jacket are selectively pivotable relative to one another about a pivot axis.

10. A steering column assembly having a standard operating position and a collapsed position, comprising:
    a lower column jacket;
    an upper column jacket selectively slidable relative to the lower column jacket;
    a rake bracket attached to the lower column jacket, the rake bracket having a bracket retaining feature;
    a housing attached to the upper column jacket, the housing configured to exert a displacement force as the steering column assembly is actuated between the standard operating position and the collapsed position;
    a biasing member that selectively exerts a biasing force on the upper column jacket in the standard operating position, the biasing member having a biasing member retaining feature that engages with the bracket retaining feature in the standard operating position and disengages with the bracket retaining feature in the collapsed position, the housing configured to exert the displacement force to disengage the biasing member retaining feature with the bracket retaining feature; and
    a connector that retains a portion of the biasing member, the housing exerting the displacement force upon the connector, the displacement force configured to urge the connector and the biasing member in an axial direction towards the lower column jacket.

11. The steering column assembly as recited in claim 10, wherein the biasing member retaining feature is a curved profile configured to selectively engage with the bracket retaining feature.

12. The steering column assembly as recited in claim 11, wherein the generally curved profile is deformed to disengage from the bracket retaining feature.

13. The steering column assembly as recited in claim 12, wherein the bracket retaining feature is a plurality of ribs that selectively engage with the biasing member.

14. The steering column assembly as recited in claim 10, wherein the biasing member is constructed from a music wire conforming to ASTM 228.

15. The steering column assembly as recited in claim 10, wherein the housing is one of a switch assembly and a Column Electric Assembly (CEA).

16. The steering column assembly as recited in claim 10, wherein the rake bracket and the lower column jacket are selectively pivotable relative to one another about a pivot axis.

17. A steering column assembly having a standard operating position and a collapsed position, comprising:
    a lower column jacket;
    an upper column jacket selectively slidable relative to the lower column jacket;
    a rake bracket attached to the lower column jacket, the rake bracket and the lower column jacket being selectively pivotable relative to one another about a pivot axis, and the rake bracket having a plurality of ribs;
    a housing attached to the upper column jacket, the housing configured to exert a displacement force as the steering column assembly is actuated between the standard operating position and the collapsed position;
    a biasing member that selectively exerts a biasing force on the upper column jacket in the standard operating position, the biasing member having a generally curved profile that engages with the plurality of ribs in the standard operating position and is deformed to disengage with the plurality of ribs in the collapsed position, the housing configured to exert the displacement force to disengage the generally curved profile with the plurality of ribs; and
    a connector that retains a portion of the biasing member, the housing exerting the displacement force upon the connector, the displacement force configured to urge the connector and the biasing member in an axial direction towards the lower column jacket.

* * * * *